BEST AVAILABLE COPY

J. D. WINSLOW.

Shutter-Fastenings.

No. 5,744. Reissued Jan. 27, 1874.

Witnesses: Harry Smith
Thomas M. Ilvain

Inventor:
Jacob D. Winslow
by his Attys.
Howson and Son.

AM. PHOTO-LITHOGRAPHIC Co. N.Y. (OSBORNE'S PROCESS)

UNITED STATES PATENT OFFICE.

JACOB D. WINSLOW, OF WILMINGTON, DELAWARE, ASSIGNOR TO SAMUEL W. HAWLEY.

IMPROVEMENT IN SHUTTER-FASTENINGS.

Specification forming part of Letters Patent No. 57,239, dated August 14, 1866; reissue No. 5,744, dated January 27, 1874; application filed January 15, 1874.

*To all whom it may concern:*

Figure 1:
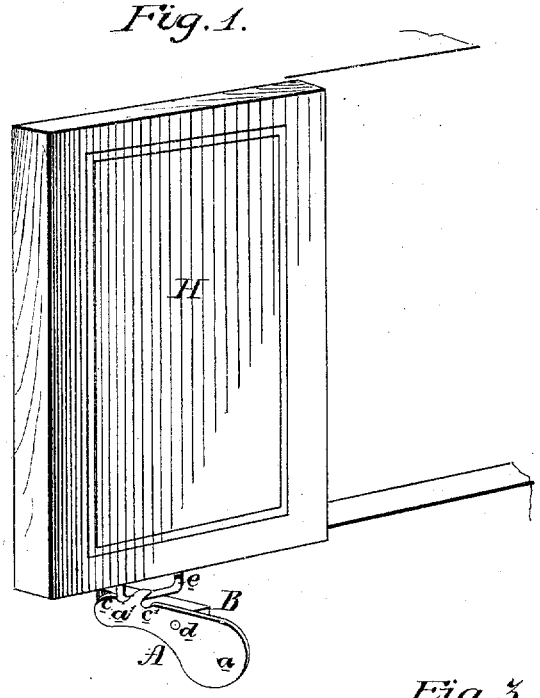

Be it known that I, JACOB D. WINSLOW, of Wilmington, in the county of New Castle, State of Delaware, have invented an Improved Shutter-Fastening, of which the following is a specification:

The object of my invention is to prevent a shutter from rattling when fastened back against a wall by the weighted turn-buckle A, (shown in the perspective view, Figure 1, and enlarged elevations, Figs. 2 and 3, of the accompanying drawing,) the said turn-buckle having a cam-like edge, *c*, which bears against and forces back the shutter, and a notch, *c'*, which receives a projection, *e*, on the said shutter when the latter is to be retained at a short distance from the wall. The turn-buckle has as its fulcrum a pin, *d*, on a bar, B, the pointed end of which is driven into the wall F in such a position that the shutter H, when opened, shall be caused to pass directly over it.

Figure 2:
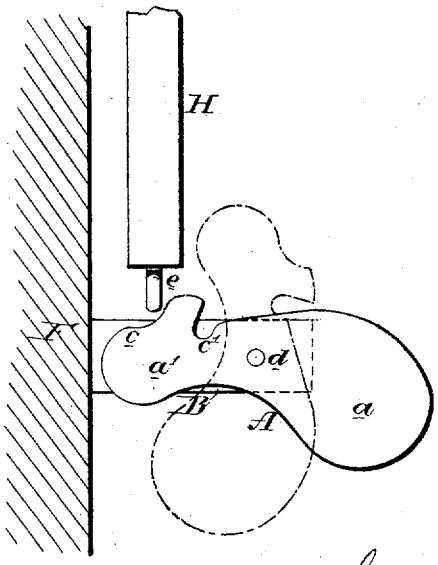
Figure 3:
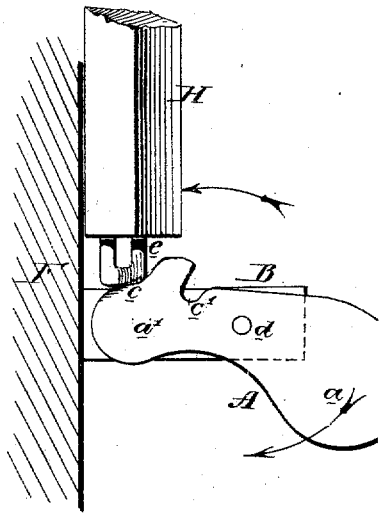

On moving the shutter back the turn-buckle will be turned from the pendulous position indicated by dotted lines to that shown by full lines in Fig. 2, and the tendency of the weighted arm *a* of the turn-buckle to fall and assume its former position will cause the cam-like edge *c* of the arm *a'* to force the shutter back against the wall, and there retain it, as shown in Fig. 3, so as to prevent all disagreeable rattling of the shutter.

If it should be desired to fasten the shutter at some little distance outward from the wall, the notch *c'* in the edge of the turn-buckle may be adjusted to receive the staple or equivalent projection *e* on the under edge of the shutter.

I claim as my invention—

1. The turn-buckle A, hung to a bar, B, and having a cam-like edge, *c*, for acting on the shutter, in the manner described.

2. The turn-buckle A, its cam-like edge *c*, and notch *c'*, in combination with the shutter H and its projection *e*, all substantially as and for the purpose specified.

In testimony whereof I have signed my name to this specification in the presence of two subscribing witnesses.

J. D. WINSLOW.

Witnesses:
WM. A. STEEL,
HARRY SMITH.